(12) United States Patent
Quinn

(10) Patent No.: US 11,242,163 B2
(45) Date of Patent: Feb. 8, 2022

(54) EVAPORATORS AND EVAPORATIVE COOLING METHODS FOR GARMENTS

(71) Applicant: Hamilton Sundstrand Corporation, Charlotte, NC (US)

(72) Inventor: Gregory John Quinn, Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/829,437

(22) Filed: Mar. 25, 2020

(65) Prior Publication Data

US 2021/0300604 A1   Sep. 30, 2021

(51) Int. Cl.
*B64G 6/00*   (2006.01)
*F24F 5/00*   (2006.01)
*A41D 13/005*  (2006.01)

(52) U.S. Cl.
CPC ........... *B64G 6/00* (2013.01); *A41D 13/0056* (2013.01); *F24F 5/0035* (2013.01)

(58) Field of Classification Search
CPC ..... B64G 6/00; F24F 5/0035; A41D 13/0056; B01D 61/364; B01D 3/346; B01D 69/12; B01D 67/0088; C02F 1/448; B82Y 30/00
See application file for complete search history.

(56) References Cited

U.S. PATENT DOCUMENTS

| 5,562,949 A | 10/1996 | Steele et al. |
| 6,584,798 B2 * | 7/2003 | Schegerin .......... A41D 13/0053 62/259.3 |
| 8,857,203 B2 | 10/2014 | Hodgson |
| 9,751,047 B2 | 9/2017 | Lienhard et al. |
| 10,456,750 B2 | 10/2019 | Visser et al. |
| 2007/0144716 A1 | 6/2007 | Doh et al. |
| 2013/0233000 A1* | 9/2013 | Hodgson .................. B64G 6/00 62/56 |

FOREIGN PATENT DOCUMENTS

| CN | 105479585 B | 4/2016 |
| JP | 2003088722 A | 3/2003 |

\* cited by examiner

*Primary Examiner* — Emmanuel E Duke
(74) *Attorney, Agent, or Firm* — Cantor Colburn LLP

(57) ABSTRACT

An evaporator includes a housing with a first end and a longitudinally opposite second end, a hydrophobic membrane arranged within the housing fluidly coupling the first end of the housing to the second end of the housing, and a hydrophilic surface. The hydrophilic surface is arranged within the housing between the first end and the second end of the housing and is spaced apart from the hydrophobic membrane to draw liquid water away from the hydrophobic hollow fiber membrane. Spacesuits and environmental control methods are also described.

14 Claims, 4 Drawing Sheets

EVAPORATORS AND EVAPORATIVE COOLING METHODS FOR GARMENTS

BACKGROUND

The present disclosure is generally directed to environmental control for garments, and more particularly to evaporatively cooled garments.

Evaporative coolers, such as in space vehicles and spacesuits, are commonly employed to remove heat from environmentally controlled spaces by circulating water between the environmentally controlled space and an evaporator. The evaporator typically receives warm water from the environmentally controlled space, chills the water through evaporative cooling, and returns chilled water to the environmentally controlled space to acquire additional heat. The evaporative cooling is generally accomplished by flowing the warm water through a hollow fiber membrane under low pressure. The low pressure vaporizes a portion of the water traversing the fibers, typically at relatively low temperature due to the low pressure, and causing water vapor (e.g., steam) to exit the hollow fiber membrane for rejection to the ambient environment. As the liquid water flashes to vapor heat is removed from the remaining liquid water, chilling the liquid water.

One challenge to evaporators employing fiber membranes is keeping the exterior of the fibers forming the membrane dry. Specifically, if water comes into contact with the exterior of a fiber the fiber leaks, water flowing through the fiber (in the case of a hollow fiber membrane) and flooding the chamber housing the hollow fiber membrane and shutting down the evaporative cooling process. Water can accumulate within chamber housing the fiber membrane if, for example, from leaks in fibers forming the fiber membrane and/or due to condensation of water vapor prior to issue of the water vapor to the ambient environment.

Such systems and methods have generally been acceptable for their intended purpose. However, there remains a need for improved evaporators, spacesuits having evaporative cooling, and environmental control methods employing evaporative cooling.

BRIEF DESCRIPTION

Disclosed is an evaporator that includes a housing with a first end and a longitudinally opposite second end and a hydrophobic membrane arranged within the housing fluidly coupling the first end of the housing to the second end of the housing. The evaporator also includes a hydrophilic surface arranged within the housing between the first end and the second end of the housing, wherein the hydrophilic surface is spaced apart from the hydrophobic membrane to draw liquid water away from the hydrophobic membrane.

In addition to one or more of the features described above, or as an alternative to any of the foregoing embodiments, the housing defines therethrough an orifice fluidly coupling the interior of the housing to the environment external to the housing.

In addition to one or more of the features described above, or as an alternative to any of the foregoing embodiments, the evaporator can also include a steam valve seated in the housing and fluidly coupling the interior of the housing to an external environment outside the evaporator.

In addition to one or more of the features described above, or as an alternative to any of the foregoing embodiments, the evaporator can also include a vacuum source fluidly coupled to the interior of the housing to chill water provided to the first end of the housing and issue chilled water from the second end of the housing.

In addition to one or more of the features described above, or as an alternative to any of the foregoing embodiments, the evaporator can also include a wearable including a heat exchanger fluidly coupling the first end of the housing to the second end of the housing.

In addition to one or more of the features described above, or as an alternative to any of the foregoing embodiments, the evaporator can be in combination with a spacesuit including a heat exchanger fluidly coupling the first end of the housing to the second end of the housing.

In addition to one or more of the features described above, or as an alternative to any of the foregoing embodiments, the evaporator can also include a feedwater source fluidly coupled between the first end of the housing and the second end of the housing.

In addition to one or more of the features described above, or as an alternative to any of the foregoing embodiments, the hydrophilic surface comprises a coating disposed on an inner surface of the housing.

In addition to one or more of the features described above, or as an alternative to any of the foregoing embodiments, the hydrophilic surface comprises a surface feature within an inner surface of the housing.

In addition to one or more of the features described above, or as an alternative to any of the foregoing embodiments, the evaporator can also include an inlet end cap connected to the first end of the housing.

In addition to one or more of the features described above, or as an alternative to any of the foregoing embodiments, the hydrophobic membrane is a hydrophobic hollow fiber membrane, wherein the inlet end cap is in liquid communication with the second end of the housing through fibers of the hydrophobic hollow fiber membrane.

In addition to one or more of the features described above, or as an alternative to any of the foregoing embodiments, the inlet end cap is in vapor communication with the hydrophilic surface through micropores defined through fibers of the hydrophobic hollow fiber membrane.

In addition to one or more of the features described above, or as an alternative to any of the foregoing embodiments, the evaporator can also include an outlet end cap connected to the second end of the housing and in liquid communication with the first end of the housing through fibers of the hydrophobic hollow fiber membrane.

Also disclosed is a space suit that includes a wearable containing a heat source; a heat exchanger arranged within the wearable and in thermal communication with the heat source; and an evaporator as described in any of the above embodiments.

Technical effects of the present disclosure include evaporators with relatively high reliability. In certain examples evaporators described herein wick water away from the hydrophobic hollow fiber membrane contained within the evaporator, the wicking action drawing accumulated liquid water away from the hydrophobic hollow fiber membrane and preventing the liquid form though the hydrophobic hollow fiber membrane. In accordance with certain examples evaporators described herein are tolerant of condensation and/or leakage of the hydrophobic hollow fiber membrane contained within the evaporator.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
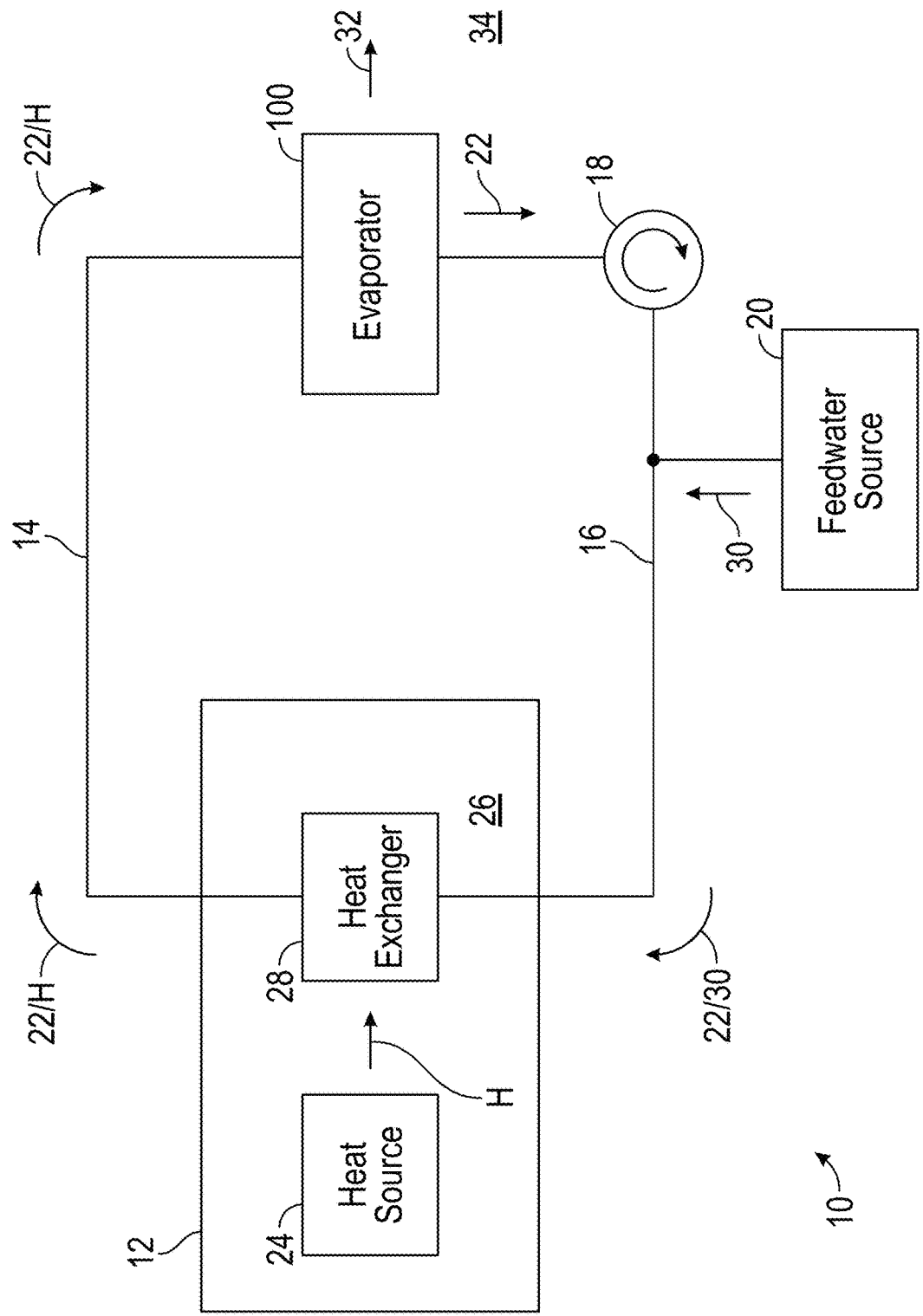
FIG. 1 is a schematic view of a spacesuit having an evaporator constructed in accordance with the present disclosure, showing the evaporator removing heat from the spacesuit by chilling water heated by the spacesuit.

Reference will now be made to the drawings wherein like reference numerals identify similar structural features or aspects of the subject disclosure. For purposes of explanation and illustration, and not limitation, a partial view of an example of an evaporator for a spacesuit constructed in accordance with the disclosure is shown in FIG. 1 and is designated generally by reference character 100. Other embodiments of evaporators, spacesuits, and environmental control methods in accordance with the present disclosure are provided in FIGS. 2-6, as will be described. The systems and methods described herein can be used to provide evaporative cooling to vehicles and wearables, such as space vehicles and spacesuits, though the present disclosure is not limited to any particular type of vehicle or wearable.

With reference to FIG. 1, an evaporative cooling arrangement 10 is shown. The evaporative cooling arrangement 10 includes the evaporator 100, an environmentally controlled structure 12, a coolant return conduit 14, and a coolant supply conduit 16. The evaporative cooling arrangement 10 also includes a pump 18, a feedwater source 20, a coolant 22, and a heat source 24.

The environmentally controlled structure 12 has an interior 26 and includes a heat exchanger 28. The heat exchanger 28 is in thermal communication with the interior 26 of the environmentally controlled structure 12, fluidly couples the coolant supply conduit 16 to the coolant return conduit 14, and is arranged to communicate heat H, e.g., waste heat from electronics and/or body heat from an occupant, from the interior 26 of the environmentally controlled structure 12 to the coolant 22 through the heat exchanger 28. In certain examples the environmentally controlled structure 12 is a vehicle, such as a space vehicle. In accordance with certain examples the environmentally controlled structure 12 can be a wearable, such as a spacesuit. It is contemplated that the heat source 24 include an electrical device and/or an occupant of a vehicle or a wearable. It is also contemplated that the coolant include water, e.g., liquid water.

The coolant return conduit 14 return conduit fluidly couples the environmentally controlled structure 12 to the evaporator 100. More specifically, the coolant return conduit 14 fluidly couples the heat exchanger 28 to the evaporator 100 to communicate the coolant 22, once heated by the environmentally controlled structure 12, to the evaporator 100. The evaporator 100 is configured to chill the coolant 22 by flowing the coolant through fibers of a hydrophobic membrane 102 (shown in FIG. 2), under low pressure or vacuum, and return the coolant 22 once chilled to the coolant return conduit 14. In the following description, the member 102 may be illustrated as a hollow fiber member and occasion described as such. However, this is not meant as limiting and the skilled artisan will realize that the membrane can be include other mechanical forms of a microporous membrane such as sheet membranes.

The pump 18 is arranged along the coolant return conduit 14 and is configured to drive the coolant 22 to the environmentally controlled structure 12. Specifically, the pump 18 is configured to force the coolant 22, once chilled by the evaporator 100, to the heat exchanger 28, and therethrough to the evaporator 100. The feedwater source 20 is fluidly coupled to the coolant return conduit 14 to provide feedwater 30 to the coolant 22 to replace water vapor 32 removed from the coolant 22 and expelled from the evaporator 100 by the evaporator 100. Although shown and described herein as connected to the coolant return conduit 14 at location fluidly between the evaporator 100 and the pump 18, it is to be understood and appreciated that the feedwater source 20 can be connected between the pump 18 and the heat exchanger 28 and/or between the heat exchanger 28 and the evaporator 100 and remain within the scope of the present disclosure.

Figure 2:
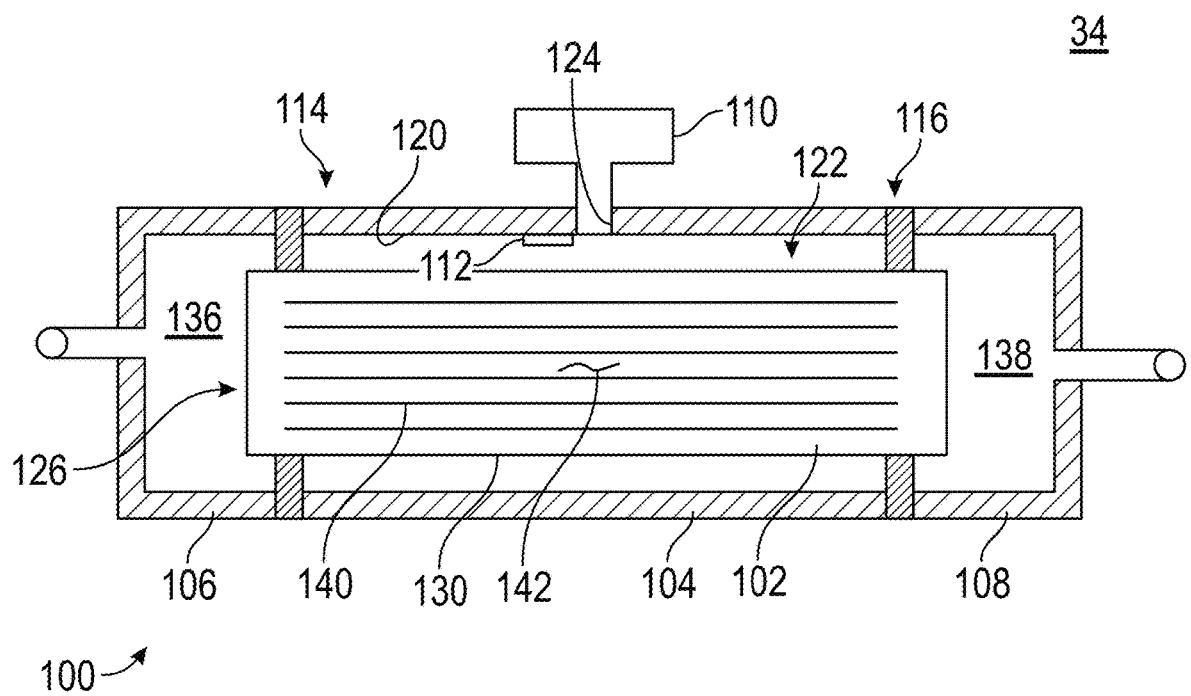
FIG. 2 is a longitudinal cross-section of the evaporator of FIG. 1, schematically showing water vapor being drawn from liquid water traversing a hydrophobic hollow fiber membrane contained within a housing of the evaporator.

With reference to FIG. 2, the evaporator 100 is shown according to an example. The evaporator 100 includes the hydrophobic membrane 102, a housing 104, and an inlet end cap 106. The evaporator 100 also includes an outlet end cap 108, a steam valve 110, and a hydrophilic surface 112.

The housing 104 has a first end 114, a second end 116, and a wall 118. The wall 118 extends from the first end 114 to the second end 116, has an inner surface 120 bounding an interior 122 of the housing 104, and defines therethrough an orifice 124. The orifice 124 fluidly couples the interior 122 of the housing 104 to the external environment 34 (shown in FIG. 1). In certain examples the orifice 124 directly couples the interior 122 of the housing 104 to the external environment 34. In accordance with certain examples the steam valve 110 is seated in the orifice 124 and fluidly couples the interior 122 of the housing 104 to the external environment 34 for selective fluid communication with the external environment 34. It is contemplated that, in accordance with certain examples, that the external environment 34 be of low-pressure, e.g., be less that ambient pressure at sea level on the earth. In certain examples a vacuum source is fluidly coupled to the orifice 124. In accordance with certain examples, the vacuum source can be fluidly coupled to the steam valve 110. It is also contemplated that, in accordance with certain examples, that the vacuum source 36 can be an extraterrestrial atmosphere or the vacuum of space.

The hydrophobic membrane 102 is supported within the interior 122 of the housing 104, has an inlet end 126, an opposite outlet end 128, and an exterior 130. The exterior 130 of the hydrophobic membrane 102 and the inner surface 120 of the housing 104 define therebetween a vapor plenum 132. The vapor plenum 132 is fluidly coupled to the external environment 34 (shown in FIG. 4) by the orifice 124, the vapor plenum 132 thereby in fluid communication with the external environment 34. In certain examples the vapor plenum 132 is fluidly coupled to the external environment 34 by the steam valve 110. The hydrophobic membrane 102 as illustrated includes a plurality of hollow fibers 134 having fiber walls 140 that define therethrough micropores 142. The hydrophobic membrane 102 extends between the inlet end 126 and the outlet end 128 of the hydrophobic membrane 102. The hydrophobic membrane 102 is further supported within the housing 104 such that the inlet end 126 of the hydrophobic membrane 102 is located within the first end 114 of the housing 104, the outlet end 128 the hydrophobic hollow fiber membrane 102 is located within the second end 116 of the housing 104, and that the vapor plenum 132 be defined between the inlet end 126 and the outlet end 128 the hydrophobic membrane 102. Examples of suitable hydrophobic hollow fiber membranes include Membrana® microporous membranes, available from the 3M Corporation of St. Paul, Minn.

The inlet end cap 106 seats on the first end 114 of the housing 104, defines an inlet plenum 136 between the inlet end cap 106 and the inlet end 126 of the hydrophobic membrane 102, and fluidly couples the coolant return conduit 14 (shown in FIG. 1) to the inlet end 126 of the hydrophobic membrane 102. The outlet end cap 108 seats on the second end 116 of the housing 104, defines an outlet plenum 138 between the outlet end 128 of the hydrophobic membrane 102, and fluidly couples the outlet end 128 of the hydrophobic membrane 102 to the coolant supply conduit 16 (shown in FIG. 1).

During operation the evaporator 100 chills coolant, e.g., the coolant 22 (shown in FIG. 1), once warmed by a heat source, e.g., the heat source 24 (shown in FIG. 1). In this respect the coolant supply conduit 16 (shown in FIG. 1) provides the coolant 22 carrying heat H (shown in FIG. 1) to the inlet plenum 136. As illustrated, the inlet plenum 136 communicates the heated coolant 22 to the hollow fibers 134 of the hydrophobic membrane 102. The hollow fibers 134 of the hydrophobic membrane 102 in turn communicate a liquid portion of the coolant 22 to the outlet plenum 138 to the outlet plenum 138 for recirculation to the heat exchanger 28 (shown in FIG. 1), and a vapor portion of the coolant 22 issued through micropores 1424 defined through fiber walls 140 of the hydrophobic membrane 102 to the external environment 34 through the vapor plenum 132 and the orifice 124 and/or the steam valve 110 as the water vapor 32. As will be appreciated by those of skill in the art in view of the present disclosure, change of a portion of the coolant 22 to vapor at low pressure (or in a vacuum) chills the liquid portion of the coolant 22 reaching the outlet plenum 138, the evaporator 100 thereby chilling the coolant 22 prior to return to the heat exchanger 28.

As will also be appreciated by those of skill in the art in view of the present disclosure, chilling requires that fiber walls 140 of the hollow fibers 134 remain dry as the coolant 22 flows through the hollow fibers 134 of the hydrophobic membrane 102. Remaining dry in turn requires that accumulated water, e.g., accumulated water 38 from condensation and/or leakage of the hollow fibers 134, ne kept away from the fiber walls 140 of the hollow fibers 134. For that reason, the evaporator 100 includes the hydrophilic surface 112, which is arranged to draw the accumulated water 38 away from the hydrophobic membrane 102.

Figure 3:
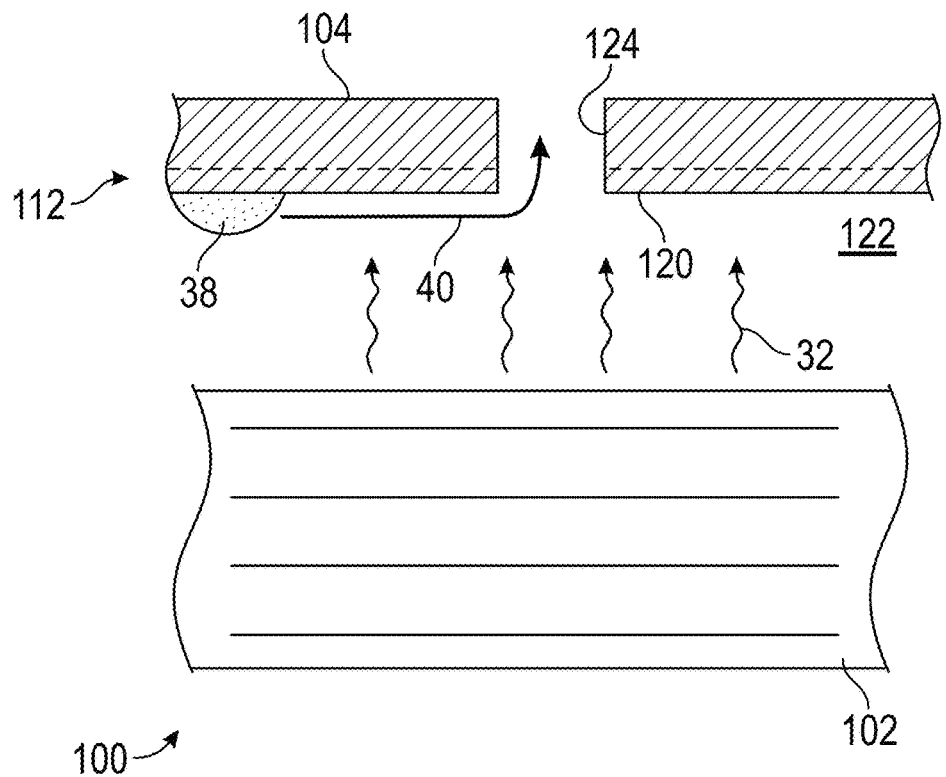
FIG. 3 is another longitudinal cross-section of the evaporator of FIG. 1, schematically showing accumulated water within the housing being wicked away from the water vapor being drawn away from the hydrophobic hollow fiber membrane by a hydrophilic surface within the housing.
Figure 4:
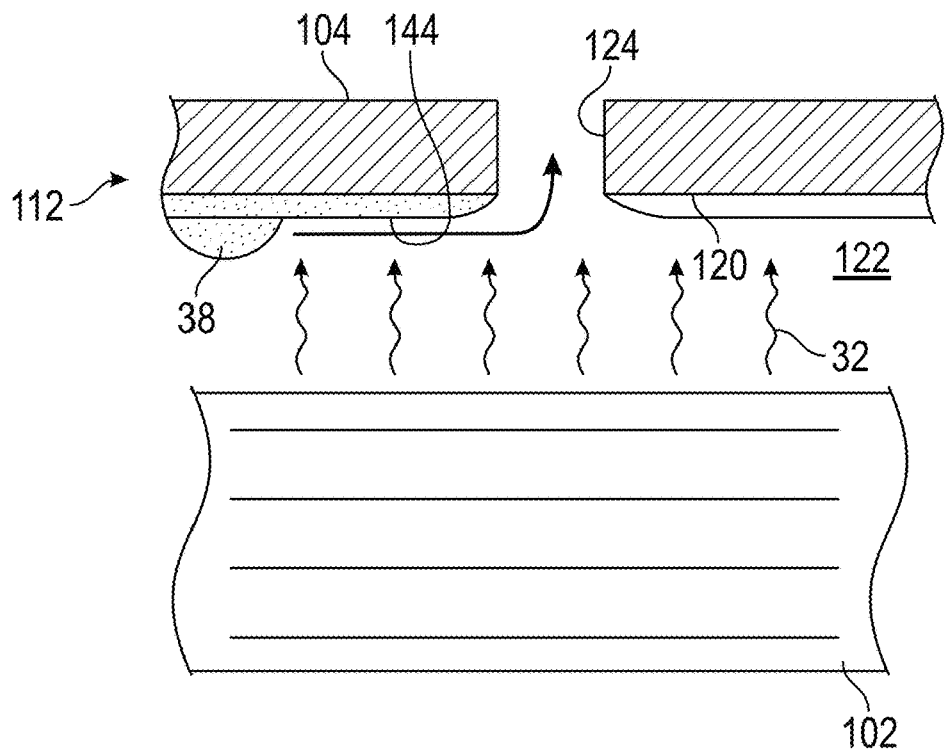
FIG. 4 is a partial cross-sectional view of the heat exchanger of FIG. 1 according to an example, showing recess defined within an inner surface of the housing defining the hydrophobic surface.
Figure 5:
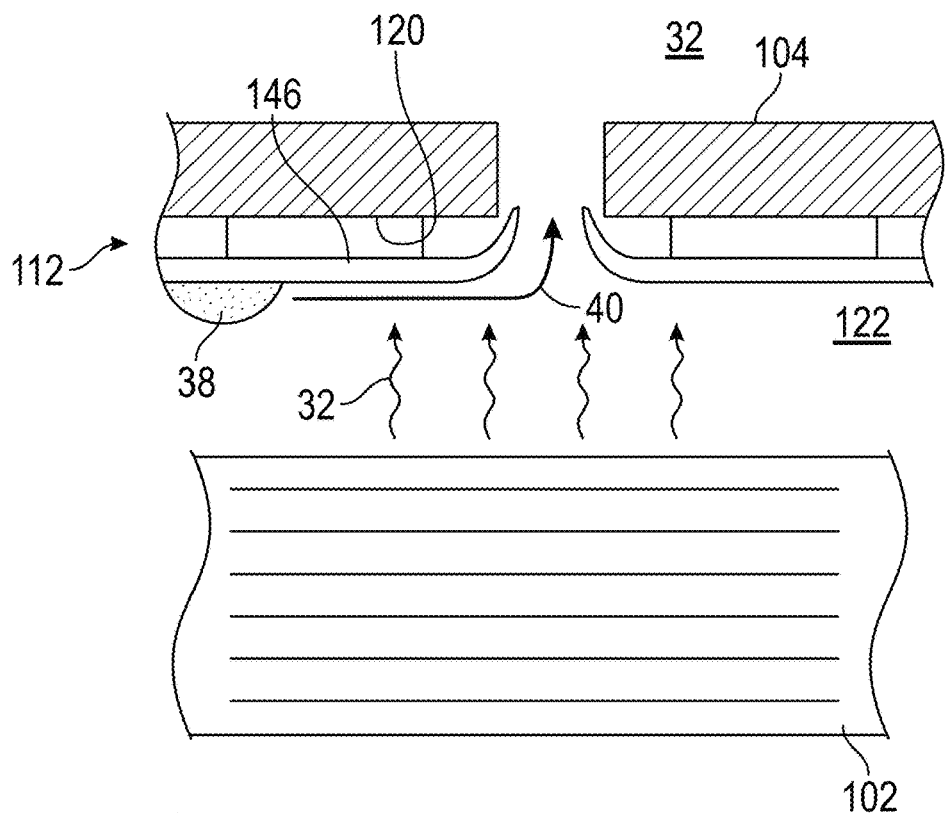
FIG. 5 is a partial cross-sectional view of the heat exchanger of FIG. 1 according to an example, showing a coating defining the hydrophilic surface defined within an inner surface of the housing.

With reference to FIGS. 3-5, the hydrophilic surface 112 is shown. The hydrophilic surface 112 is arranged within the interior 122 of the housing 104 and is disposed in communication with the vapor plenum 132. More specifically, the hydrophilic surface 112 is arranged to draw the accumulated water 38 away from the hydrophobic hollow fiber membrane 102. As shown in FIG. 3, the hydrophilic surface 112 can formed on recess 148 defined within the inner surface 120, e.g., a channel or sump, spaced apart from the hydrophobic hollow fiber membrane 102 by the hydrophobic hollow fiber membrane 102. As shown in FIG. 4, the hydrophilic surface 112 can include a hydrophilic coating 144 arranged between the inner surface 120 and the hydrophobic hollow fiber membrane 102. As shown in FIG. 5, the hydrophilic surface 112 can include a tractor feature 146 arranged within the vapor plenum 132 and between inner surface 120 of the housing 104 and the hydrophobic hollow fiber membrane 102. In certain examples the hydrophilic surface 112 is arranged to draw 40 the accumulated water 38 toward the orifice 124, e.g., by increasing in surface area in a direction toward the orifice 124 and/or the steam valve 110 Examples of suitable hydrophobic surfaces are described in U.S. Pat. No. 5,561,949 which is incorporated herein by reference.

Figure 6:
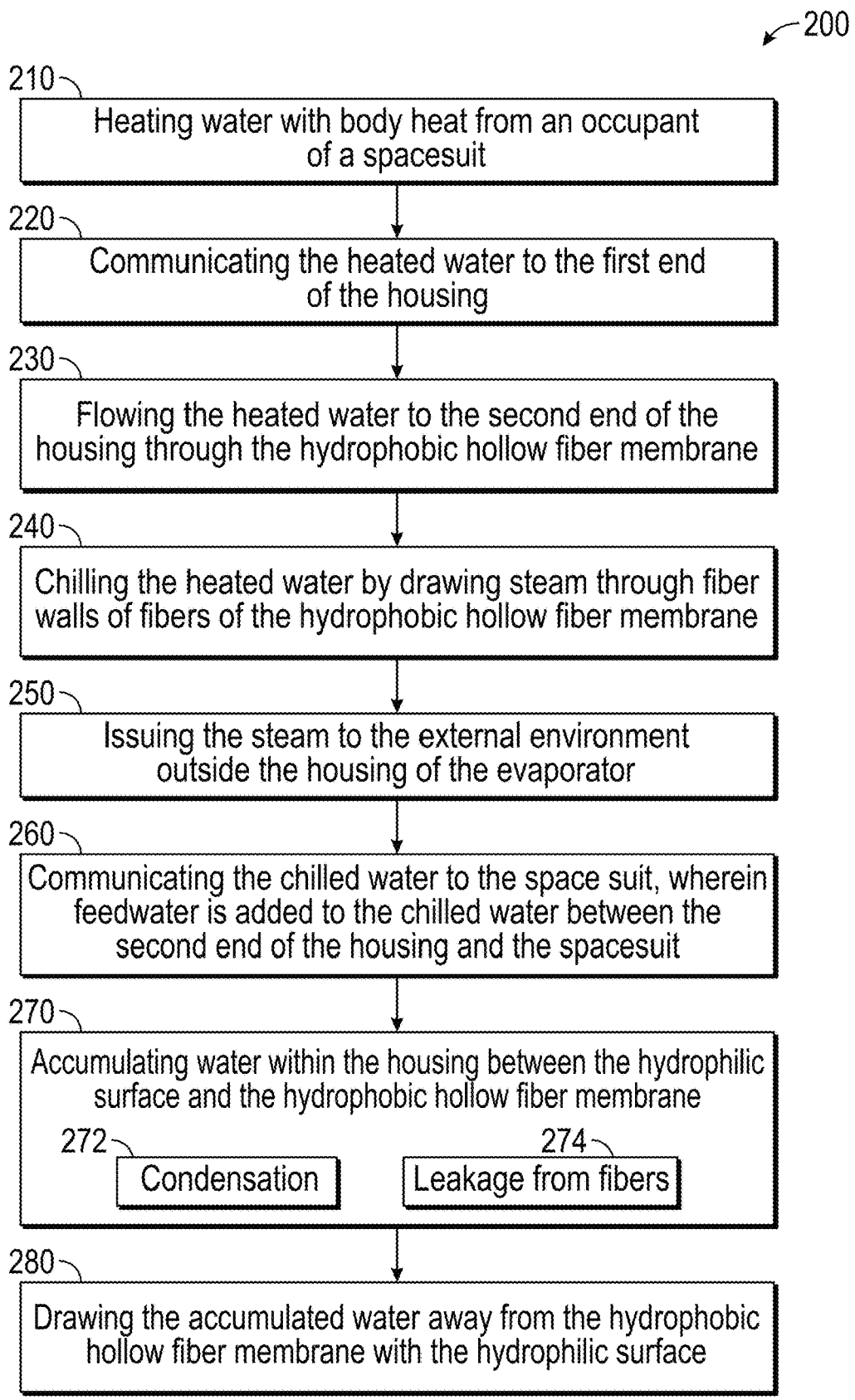
FIG. 6 is a block diagram of an environmental control method, showing operations of the method according to an illustrative and non-limiting example of the method.

With reference to FIG. 6, an environmental control method 200 is shown. The method 200 includes heating water from an occupant of a spacesuit, e.g., the coolant 22 (shown in FIG. 1) with the heat H (shown in FIG. 1) in the environmentally controlled structure 12 (shown in FIG. 1), as shown with box 210. The heated water is communicated to the first end of a housing of an evaporator, e.g., the first end 114 (shown in FIG. 2) of the evaporator 100 (shown in FIG. 1), as shown with box 220. The heated water is flowed to a second end of the housing, e.g., the second end 116 (shown in FIG. 1) of the housing, through a hydrophobic hollow fiber membrane, e.g., the hydrophobic membrane 102 (shown in FIG. 2), as shown with box 230.

As shown with box 240, the heated water is chilled by drawing steam through fiber walls of the hydrophobic membrane, e.g., through fiber walls 140 (shown in FIG. 3) of the hydrophobic membrane. It is contemplated that the steam be issued to the external environment outside of the housing of the evaporator, e.g., the external environment 34 (shown in FIG. 1), as shown with box 250. It is also contemplated that the chilled water be returned to the environmentally controlled structure, as shown with box 260. As also shown with box 260, feedwater can be added to the chilled water, e.g., the feedwater 30 (shown in FIG. 1).

As shown with box 270, the method 200 additionally includes accumulating water within the housing of the evaporator, e.g., the accumulated water 38 (shown in FIG. 3). It is contemplated that the water be accumulated within the housing between a hydrophilic surface and an inner surface of the housing, e.g., between the hydrophilic surface 112 (shown in FIG. 2) and the inner surface 120 (shown in FIG. 2) of the housing, as also shown with box 270. Accumulating water can include accumulating leakage water from the hydrophobic membrane and/or from condensation of water vapor (e.g., steam) on the inner surface of the housing, as shown with box 272 and box 274. The accumulated water is drawn away from the hydrophobic membrane with the hydrophilic surface, e.g., with a wicking action, as shown with box 280. In certain examples the accumulated water is drawn (or wicked) to an orifice and/or a steam valve, e.g., the orifice 124 (shown in FIG. 2) and/or the steam valve 110 (shown in FIG. 2), as also shown with box 280.

Spacesuits can be cooled using evaporative cooling. For example, cooling can be provided by flowing liquid water through fibers of a membrane. As the liquid water flows through the fibers of the hydrophobic membrane the outside of the membrane is exposed to low pressure or a vacuum, causing a portion of the liquid water to evaporate and traverse walls of the hollow fiber membrane. The evaporation chills the water, which the evaporator returns to the heat exchanger while the water vapor is released to the ambient environment to reject heat from the heat exchanger.

Such evaporators can reliably provide cooling while the fibers of the hollow fiber membrane remain dry. However, when the exterior of the hollow fibers forming the hydrophobic hollow fiber membrane become wet, the hydrophobic hollow fiber membranes lose their hydrophobic properties. Once the exterior of a given fiber is wetted the fiber leaks liquid water, leaking additional liquid water into the housing and forcing a shut-down of the evaporator due to the resulting cascading effect of water accumulation.

In examples described herein evaporators include a hydrophilic surface to draw water accumulated within the evaporator away from the hydrophobic hollow fiber membrane. For example, the hydrophilic surface can be arranged to wick liquid water away from the hydrophobic hollow fiber membrane to prevent the liquid water from touching the hydrophobic hollow fiber membrane. In certain examples the hydrophilic surface is spaced apart from the hydrophilic hollow fiber membrane. In accordance with certain examples the hydrophilic surface can be defined on an interior surface of the housing containing the hydrophobic hollow fiber membrane. It is contemplated that the hydrophilic surface can include, for example, a hydrophilic coating and/or a contour imparted into the interior surface of the housing.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An evaporator, comprising:
  a housing with a first end and a longitudinally opposite second end;
  a hydrophobic membrane arranged within the housing fluidly coupling the first end of the housing to the second end of the housing; and
  a hydrophilic surface arranged within the housing between the first end and the second end of the housing, wherein the hydrophilic surface is spaced apart from the hydrophobic membrane to draw liquid water away from the hydrophobic membrane.

2. The evaporator of claim 1, wherein the housing defines therethrough an orifice fluidly coupling the interior of the housing to the environment external to the housing.

3. The evaporator of claim 1, further comprising a steam valve seated in the housing and fluidly coupling the interior of the housing to an external environment outside the evaporator.

4. The evaporator of claim 1, further comprising a vacuum source fluidly coupled to the interior of the housing to chill water provided to the first end of the housing and issue chilled water from the second end of the housing.

5. The evaporator of claim 1, further comprising a wearable including a heat exchanger fluidly coupling the first end of the housing to the second end of the housing.

6. The evaporator of claim 1, in combination with a spacesuit including a heat exchanger fluidly coupling the first end of the housing to the second end of the housing.

7. The evaporator of claim 1, further comprising a feedwater source fluidly coupled between the first end of the housing and the second end of the housing.

8. The evaporator of claim 1, wherein the hydrophilic surface comprises a coating disposed on an inner surface of the housing.

9. The evaporator of claim 1, wherein the hydrophilic surface comprises a surface feature within an inner surface of the housing.

10. The evaporator of claim 1, further comprising an inlet end cap connected to the first end of the housing.

11. The evaporator of claim 10, wherein the hydrophobic membrane is a hydrophobic hollow fiber membrane, wherein the inlet end cap is in liquid communication with the second end of the housing through fibers of the hydrophobic hollow fiber membrane.

12. The evaporator of claim 10, wherein the inlet end cap is in vapor communication with the hydrophilic surface through micropores defined through fibers of the hydrophobic hollow fiber membrane.

13. The evaporator of claim 1, further comprising an outlet end cap connected to the second end of the housing and in liquid communication with the first end of the housing through fibers of the hydrophobic hollow fiber membrane.

14. A spacesuit, comprising:
  a wearable containing a heat source;
  a heat exchanger arranged within the wearable and in thermal communication with the heat source; and
  an evaporator as recited in claim 1, wherein the heat exchanger fluidly couples the first end of the housing with the second end of the housing.

* * * * *